(12) United States Patent
Ikami et al.

(10) Patent No.: US 6,351,286 B1
(45) Date of Patent: Feb. 26, 2002

(54) IMAGE PRODUCING APPARATUS ENABLING A USER TO EVALUATE AN INTERMEDIATE IMAGE

(75) Inventors: Seishi Ikami; Takashi Kobayashi, both of Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 08/991,207

(22) Filed: Dec. 16, 1997

(30) Foreign Application Priority Data

Dec. 19, 1996 (JP) .............................................. 8-339392

(51) Int. Cl.⁷ .............................................. H04N 5/222
(52) U.S. Cl. ................................... 348/362; 348/333.11
(58) Field of Search .................................. 348/207, 216, 348/217, 220, 222, 231, 232, 233, 294, 295, 296, 297, 298, 299, 311, 333.01, 333.11, 333.12; H04N 5/225

(56) References Cited

U.S. PATENT DOCUMENTS 5,272,353 A * 12/1993 Elabd ......................... 348/217
5,335,075 A * 8/1994 Komiya et al. .............. 348/298
5,420,629 A * 5/1995 Watanabe .................... 348/207
5,959,668 A * 9/1999 Cryder et al. ............... 348/229

\* cited by examiner

Primary Examiner—Tuan Ho
(74) Attorney, Agent, or Firm—Sughrue Mion, PLLC

(57) ABSTRACT

An image producing apparatus includes an imaging device having a solid state image sensor for producing image data, an exposure controller for starting and stopping exposure of the solid state image sensor at predetermined times, an image data memory for storing image data produced by the imaging device, an image processor for adding the image data produced by the imaging device to the image data stored in the image data memory every time the exposure of the solid state image sensor is stopped by the exposure controller and storing the thus obtained image data in the image data memory, and a CRT display on which an image based on the image data stored in the image data memory. According to the thus constituted image producing apparatus, it is possible to always take a picture of an object with a proper exposure time to produce an image using the solid state image sensor.

33 Claims, 4 Drawing Sheets

IMAGE PRODUCING APPARATUS ENABLING A USER TO EVALUATE AN INTERMEDIATE IMAGE

BACKGROUND OF THE INVENTION

The present invention relates to an image producing apparatus and, particularly, to such an apparatus which uses a solid state image sensor and can always take a picture of an object with an adequate exposure time to produce an image.

DESCRIPTION OF THE PRIOR ART

A chemiluminescent detecting system is known, which comprises the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, photoelectrically detecting the chemiluminescent emission in the wavelength of visible light generated by the contact of the chemiluminescent substance and the labeling substance and producing digital image signals, effecting image processing thereon, and reproducing a chemiluminescent image on a display means such as a CRT or a recording material such as a photographic film, thereby obtaining information relating to the high molecular substance such as genetic information.

Further, a fluorescence system using a fluorescent substance as a labeling substance is known. According to this system, it is possible to study a genetic sequence, the expression level of a gene and the metabolism, absorption, excretion path and state of a substance introduced into a test mouse and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing fluorescent dye or dipping a gel support on which a plurality of DNA fragments have been distributed by means of electrophoresis in a solution containing fluorescent dye, thereby labeling the electrophoresis-distributed DNA fragments, exciting the fluorescent dye by a stimulating ray to cause it to release a fluorescent light, detecting the released fluorescent light to produce an image and detecting the distribution of the DNA on the gel support. This system can also perform a process including the steps of distributing a plurality of DNA fragments on a gel support by means of electrophoresis, denaturing the DNA, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release a fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substrate, transforming the fluorescent substrate to a fluorescent substance having a fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

In the case where such chemiluminescent emission or fluorescent light is detected by a solid state image sensor to produce a chemiluminescent image or a fluorescent image, since chemiluminescent emission or fluorescent light is very weak, the solid state image sensor has to be exposed thereto for a long time. When exposing the solid state image sensor, if the exposure time is too long, an overexposed image is obtained and, on the other hand, if the exposure time is too short, an underexposed image is obtained. In either case, a desired image cannot be obtained and it is necessary to take another picture with a different exposure time. However, it is inefficient to again take a picture. In particularly, the intensity of chemiluminescent emission generated by the contact of the chemiluminescent substance and the labeling substance falls with time elapse and the amount of chemiluminescent emission becomes insufficient. Therefore, when the need arises to take anther picture because of an improper exposure time, the process has to be restarted from the first step of selectively labeling the high molecular substance with the labeling substance. Such operation is extremely troublesome.

Similar problems occur when very weak light is detected by a solid state image sensor to produce an image for observing a heavenly body or the like.

SUMMARY OF THE INVENTION

It is therefore an object of the present invention to provide an image producing apparatus which uses a solid state image sensor and can always take a picture of an object with a proper exposure time to produce an image.

The above and other objects of the present invention can be accomplished by an image producing apparatus comprising imaging means having a solid state image sensor for producing image data, exposure control means for starting and stopping exposure of the solid state image sensor at predetermined times, image data storing means for storing image data produced by the imaging means, image processing means for adding the image data produced by the imaging means to the image data stored in the image data storing means every time the exposure of the solid state image sensor is stopped by the exposure control means and storing the thus obtained image data in the image data storing means, and image displaying means for displaying an image on display means based on the image data stored in the image data storing means.

In a preferred aspect of the present invention, the imaging means is constituted as a cooled CCD (charge coupled device).

In a further preferred aspect of the present invention, the image producing apparatus further comprises input means through which the predetermined times can be determined.

In a further preferred aspect of the present invention, the imaging means further comprises an image intensifier in front of the solid state image sensor.

The present invention can be effectively applied to detect very weak light by the imaging means having the solid state image sensor and produce an image and, be particularly effectively applied to produce a chemiluminescent image or a fluorescent image by irradiating an image carrier carrying an image of a fluorescent substance with a stimulating ray and detecting fluorescent light emitted from the fluorescent substance.

In a further preferred aspect of the present invention, the image producing apparatus further comprises a light emitting diode stimulating ray source for emitting a stimulating ray whose center wavelength is between 400 nm and 700 nm.

In a further preferred aspect of the present invention, the image producing apparatus further comprises a light emitting diode stimulating ray source for emitting a stimulating ray whose center wavelength is between 400 nm and 550 nm.

In the present invention, examples of the fluorescent dye stimulable by light emitted from the light emitting diode stimulating ray source and having a wavelength of 400 to 700 nm include Fluorescein (C.I. No. 45350), Fluorescein-X indicated by the structural formula (1) shown below, YOYO-1 indicated by the structural formula (2), TOTO-1 indicated by the structural formula (3), YO-PRO-1 indicated by the structural formula (4), Cy-3 (registered trademark) indicated by the structural formula (5), Nile Red indicated by the structural formula (6), BCECF indicated by the structural formula (7), Rhodamine 6G (C.I. No. 45160), Acridine Orange (C.I. No. 46005), SYBR Green ($C_2H_6OS$), Ethidium Bromide indicated by the structural formula (9), Texas Red indicated by the structural formula (10), Propidium Iodide indicated by the structural formula (11), POPO-3 indicated by the structural formula (12), Quantum Red, R-Phycoerrythrin, Red 613, Red 670, Fluor X, FAM, AttoPhos, Bodipy phosphatidylcholine, SNAFL, Calcium Green, Fura Red, Fluo 3, AllPro, NBD phosphoethanolamine, Carboxyrhodamine (R6G), JOE, HEX, Ethidium homodimer, Lissamine rhodamine B peptide, Cy-5 (registered trademark) indicated by the structural formula (8), Allphycocyanin and the like.

In the present invention, examples of the fluorescent dye stimulable by light emitted from the light emitting diode stimulating ray source and having a wavelength of 400 to 550 nm include Fluorescein (C.I. No. 45350), Fluorescein-X indicated by the structural formula (1) shown below, YOYO-1 indicated by the structural formula (2), TOTO-1 indicated by the structural formula (3), YO-PRO-1 indicated by the structural formula (4), Cy-3 (registered trademark) indicated by the structural formula (5), Nile Red indicated by the structural formula (6), BCECF indicated by the structural formula (7), Rhodamine 6G (C.I. No. 45160), Acridine Orange (C.I. No. 46005), SYBR Green ($C_2H_6OS$), Ethidium Bromide indicated by the structural formula (9), Texas Red indicated by the structural formula (10), Propidium Iodide indicated by the structural formula (11), POPO-3 indicated by the structural formula (12), Quantum Red, R-Phycoerrythrin, Red 613, Red 670, Fluor X, FAM, AttoPhos, Bodipy phosphatidylcholine, SNAFL, Calcium Green, Fura Red, Fluo 3, AllPro, NBD phosphoethanolamine, Carboxyrhodamine (R6G), JOE, HEX, Ethidium homodimer, Lissamine rhodamine B peptide and the like.

(1)

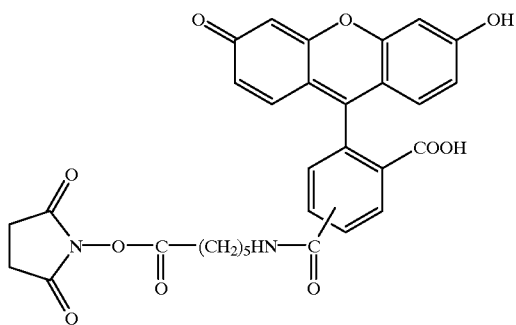

Fluorescein-X (2)

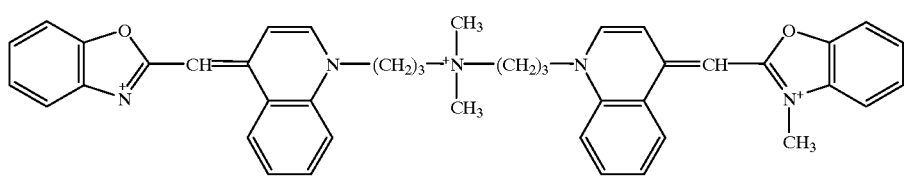

YOYO-1

(3)

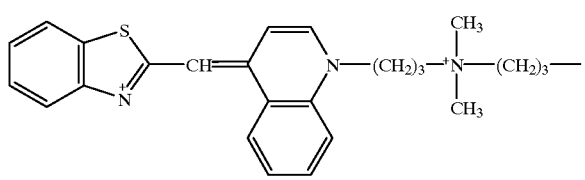

-continued
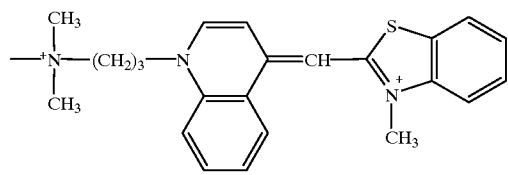
TOTO-1
(4)
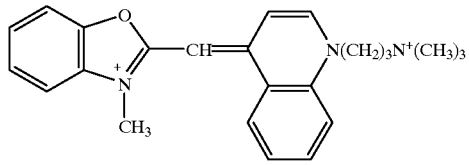
YO-PRO-1
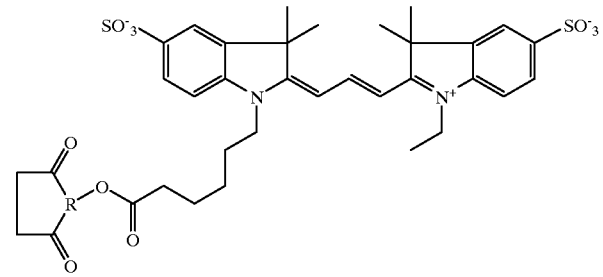
Cy-3
(5)
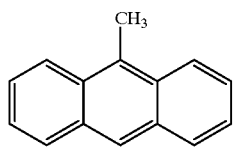
Nile Red
(6)
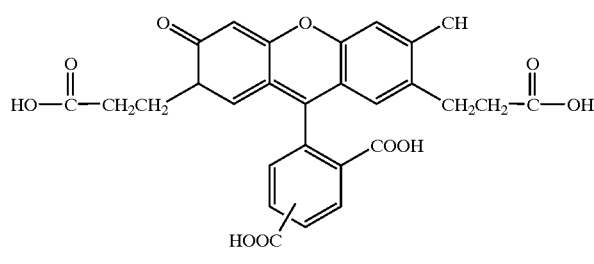
BCECF
(7)
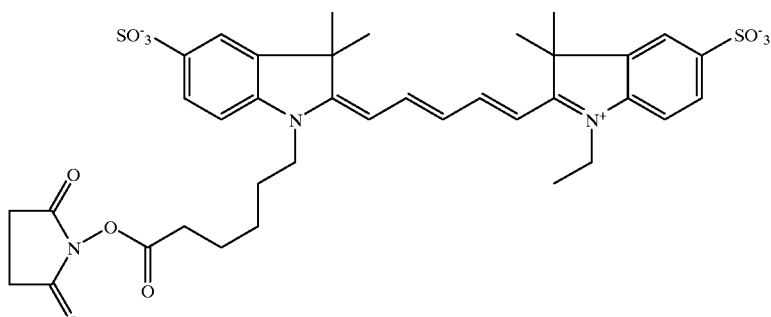
Cy-5
(8)
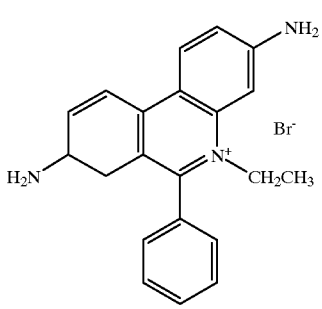
Ethidium Bromide
(9)
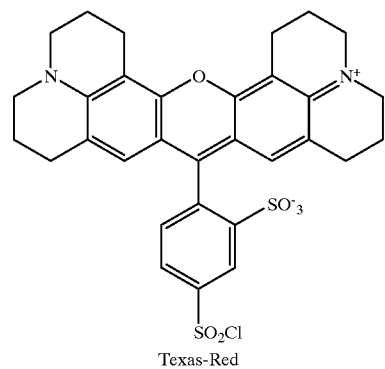
Texas-Red
(10)

(11)

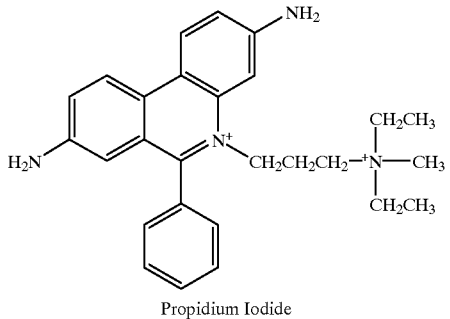

Propidium Iodide (12)

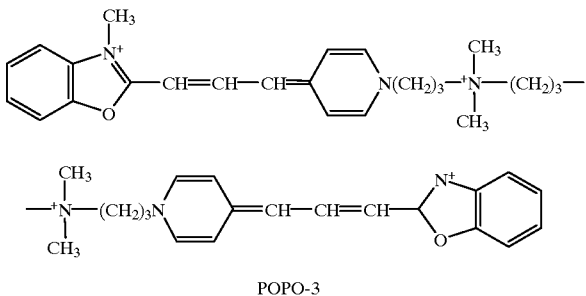

POPO-3

The above and other objects and features of the present invention will become apparent from the following description made with reference to the accompanying drawings.

DESCRIPTION OF THE PREFERRED EMBODIMENT

Figure 1:
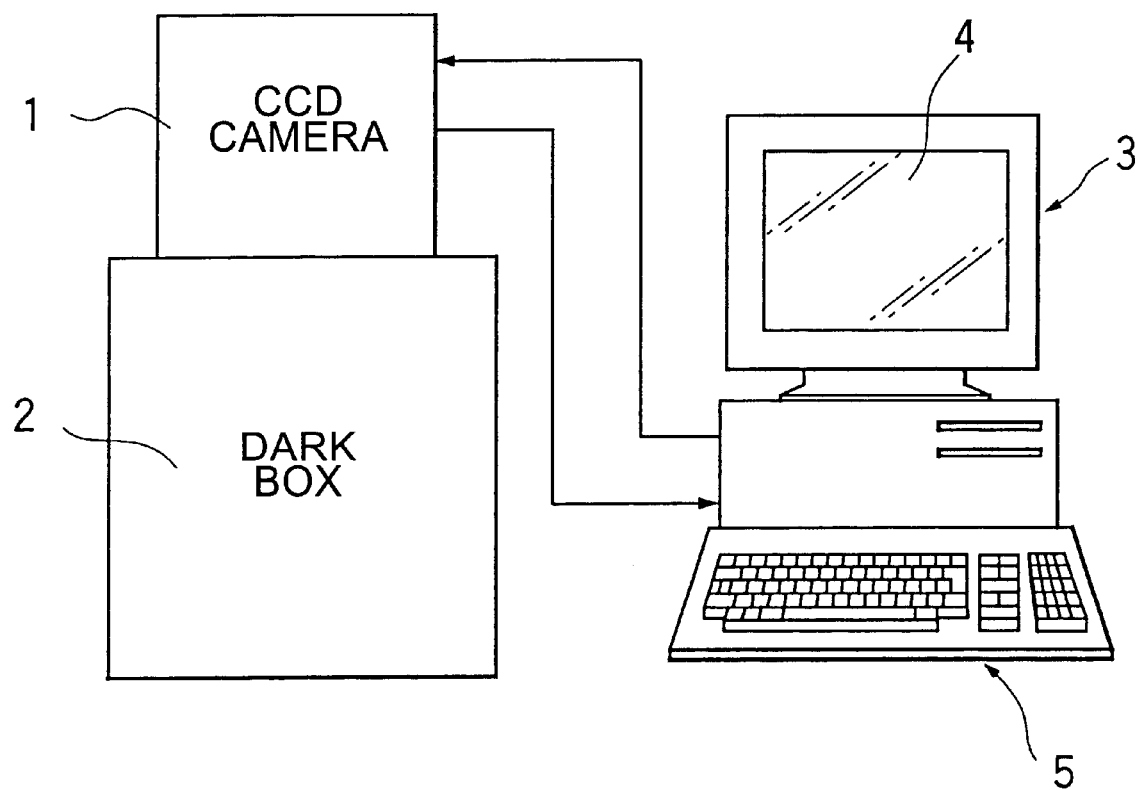
FIG. 1 is a schematic front view showing an image producing apparatus which is an embodiment of the present invention.

As shown in FIG. 1, an image producing apparatus includes a cooled CCD camera 1, a dark box 2 and a personal computer 3. The personal computer 3 is equipped with a CRT display 4 and a keyboard 5.

Figure 2:
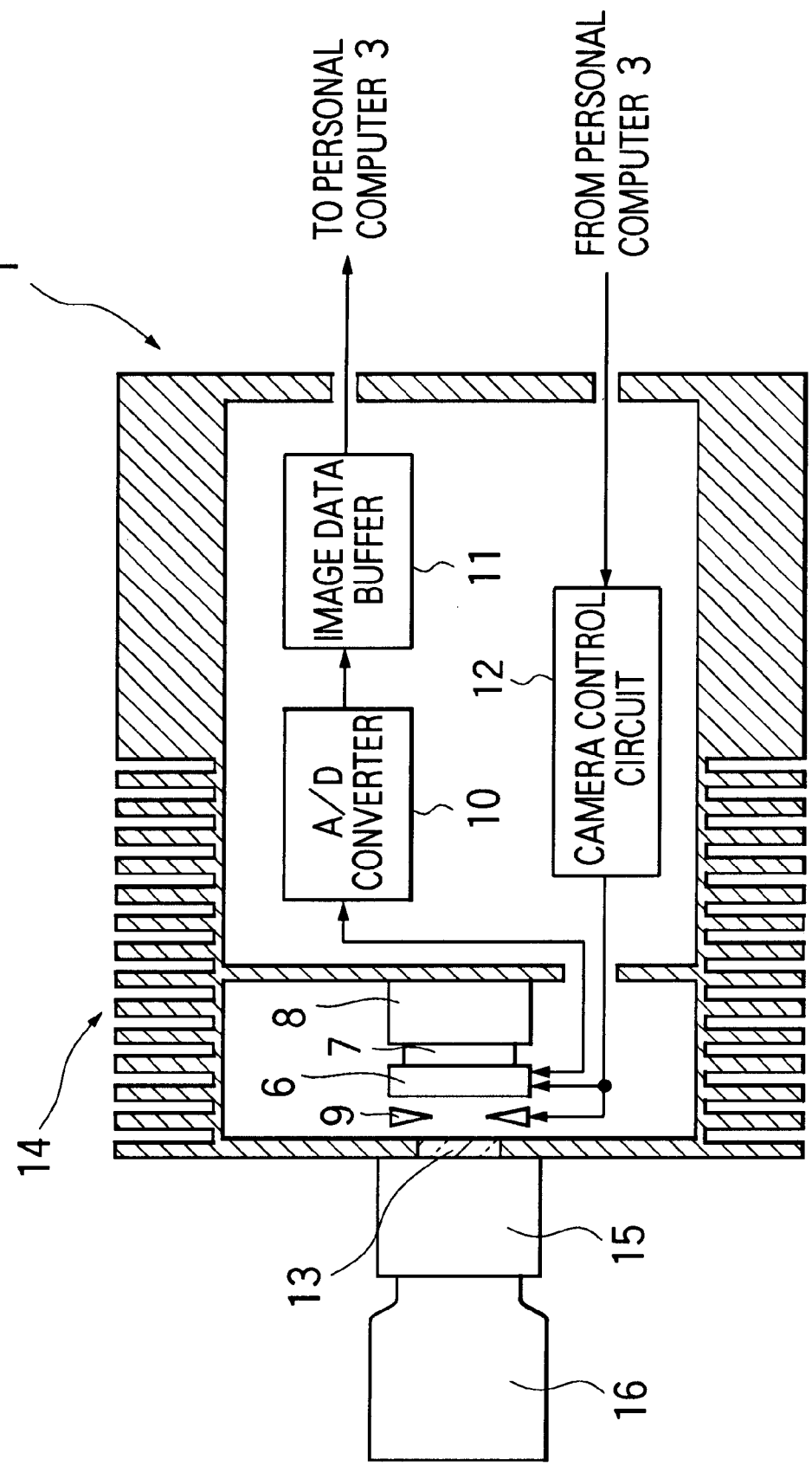
FIG. 2 is a schematic longitudinal cross sectional view showing a cooled CCD camera.

FIG. 2 is a schematic longitudinal cross sectional view showing the cooled CCD camera 1.

As shown in FIG. 2, the cooled CCD camera 1 includes a CCD (charge coupled device) 6, a heat transfer plate 7 made of a metal such as aluminum, a Peltier element 8, a shutter 9 positioned in front of the CCD 6, an A/D converter 10 for converting analog image data produced by the CCD 6 to digital image data, an image data buffer 11 for temporarily storing image data digitized by the A/D converter 10 and a camera controlling circuit 12 for controlling the operation of the cooled CCD camera 1. An opening portion formed between the cooled CCD camera 1 and the dark box 2 is closed by a glass plate 13 and the periphery of the cooled CCD camera 1 is formed with heat dispersion fins 14 over substantially half its length for dispersing heat released from the Peltier element 8.

An image intensifier 15 disposed in the dark box 2 is provided in front of the glass plate 13 and a camera lens 16 is mounted on the front surface of the image intensifier 15.

Figure 3:
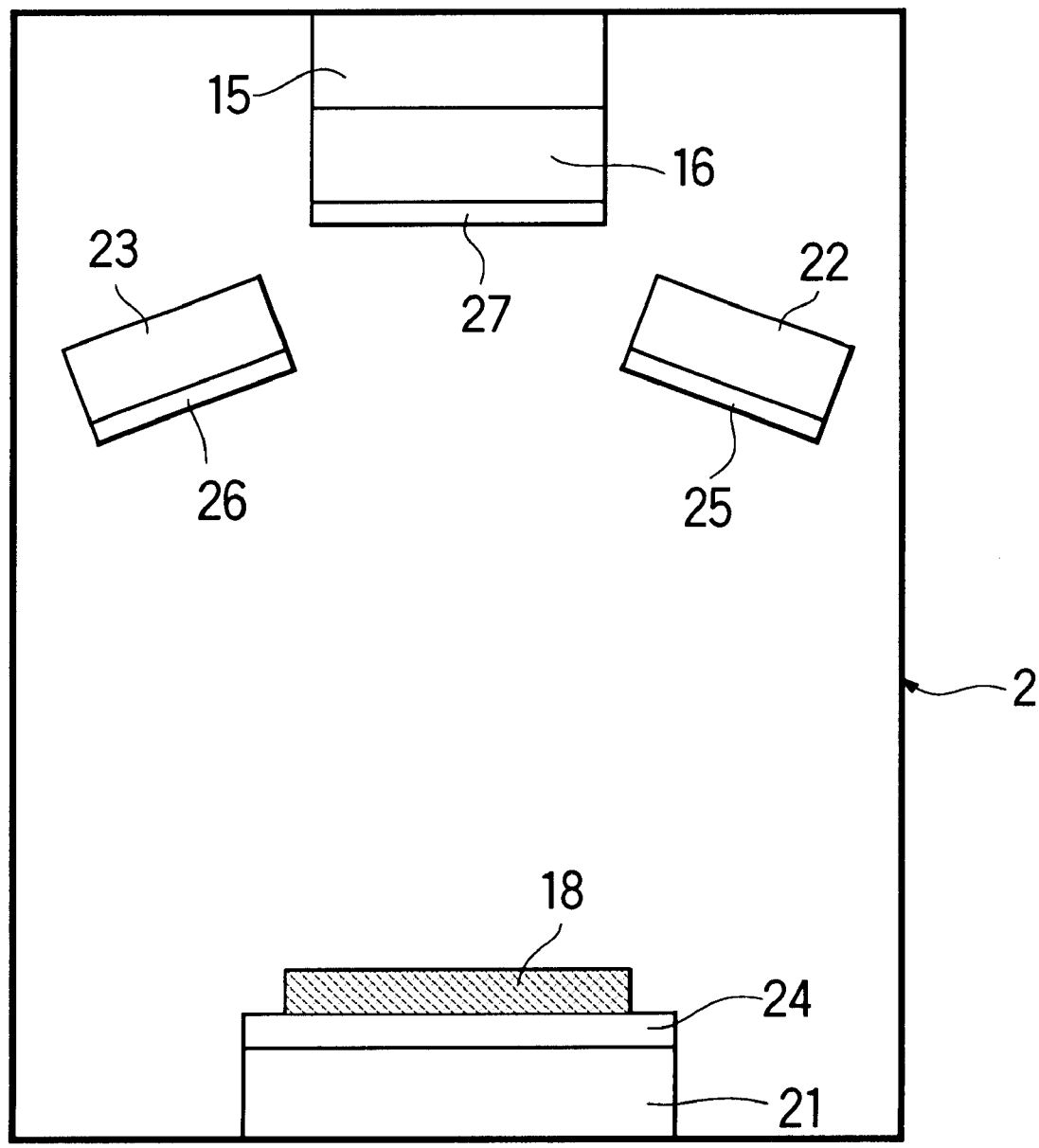
FIG. 3 is a schematic vertical cross sectional view showing a dark box.

FIG. 3 is a schematic longitudinal cross sectional view of the dark box 2.

As shown in FIG. 3, the dark box 2 is equipped with a first blue light emitting diode stimulating ray source 21 for emitting a stimulating ray whose center wavelength is 450 nm, and a second blue light emitting diode stimulating ray source 22 and a third blue light emitting diode stimulating ray source 23 are provided obliquely above the first blue light emitting diode stimulating ray source 21, each being adapted for emitting a stimulating ray whose center wavelength is 450 nm. A filter 24 is adhered to the upper surface of the first blue light emitting diode stimulating ray source 21 and filters 25, 26 are respectively adhered to the front surfaces of the second blue light emitting diode stimulating ray source 22 and the third blue light emitting diode stimulating ray source 23. The filters 24, 25, 26 cut light of wavelengths other than one in the vicinity of 450 nm and harmful to the stimulation of a fluorescent substance and transmit light having a wavelength in the vicinity of 450 nm. A filter 27 for cutting the stimulating ray having a wavelength in the vicinity of 450 nm is detachably provided on the front surface of the camera lens 16.

Figure 4:
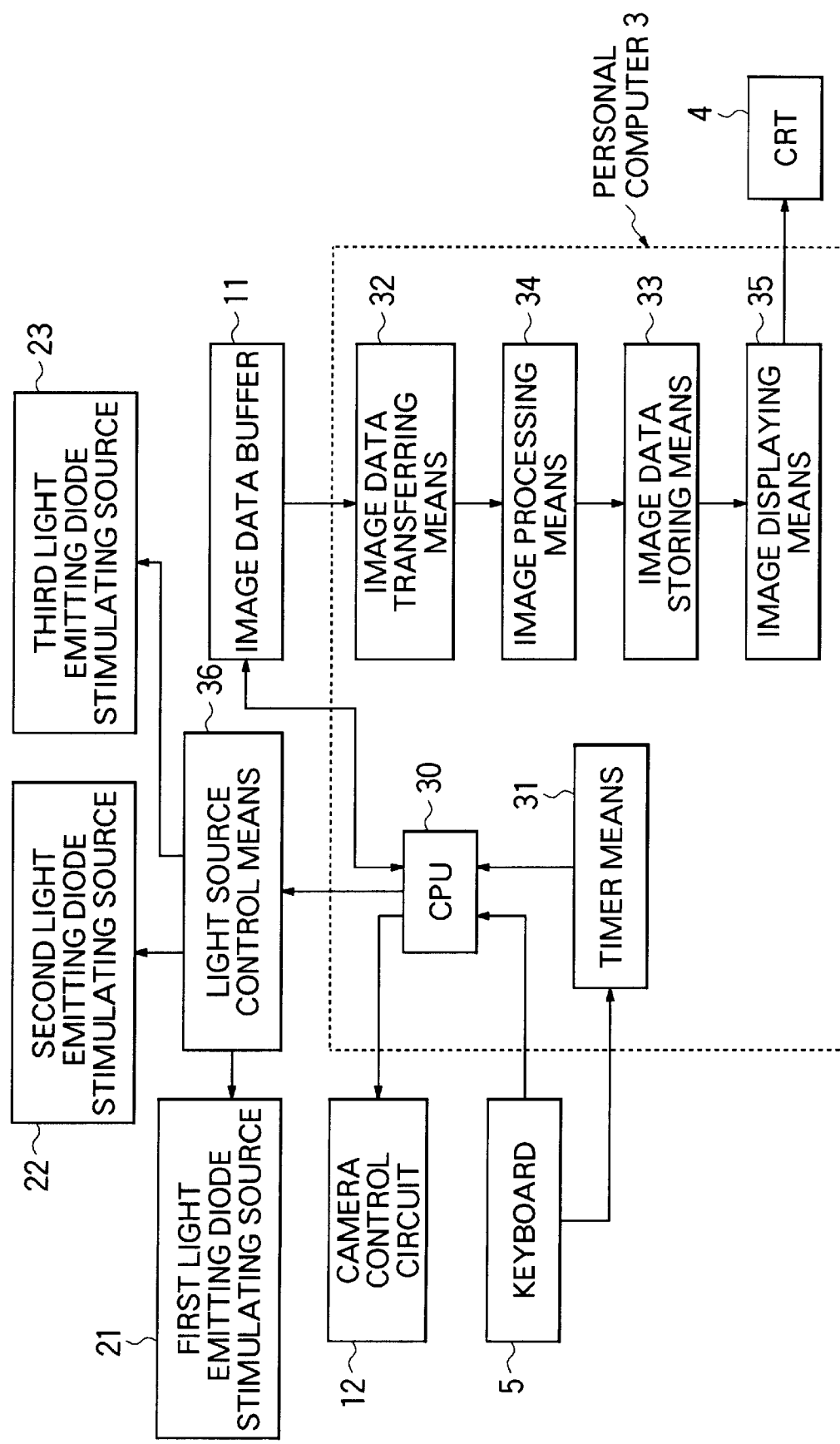
FIG. 4 is a block diagram of a personal computer and peripheral devices thereof.

FIG. 4 is a block diagram of the personal computer 3 and the peripheral devices thereof.

As shown in FIG. 4, the personal computer 3 includes a CPU 30 for controlling the exposure of the cooled CCD camera 6, a timer means 31 for storing an exposure time input by a user, an image data transferring means 32 for reading the image data produced by the cooled CCD camera 1 from the image data buffer 11, an image processing means 34 for effecting image processing on the image data read out by the image data transferring means 32 and storing them in an image data storing means 33, and an image displaying means 35 for producing a visual image on the screen of the CRT display 4 based on the image data stored in the image data storing means 33. The first blue light emitting diode stimulating ray source 21, the second blue light emitting diode stimulating ray source 22 and the third blue light emitting diode stimulating ray source 23 are controlled by a light source control means 36 and an instruction signal can be input via the CPU 30 to the light source control means 36 through the keyboard 5. The CPU 30 is constituted so as to output various signals to the camera controlling circuit 12 of the cooled CCD camera 1.

The image producing apparatus according to this embodiment is adapted to detect a fluorescent light emitted from an image carrier carrying an image of a fluorescent substance and chemiluminescence emission generated by contacting a chemiluminescent substance with a labeling substance and produce a fluorescent image and a chemiluminescent image.

In a conventional image producing apparatus using a cooled CCD camera 1, the CPU 30 outputs an exposure signal to the camera controlling circuit 12 of the cooled CCD camera 1 in accordance with an exposure time input by the user through the keyboard 5 or an exposure time selected by the CPU 30 from among exposure times determined for each kind of sample and stored in a memory associated with the CPU 30 in accordance with the kind of sample input by the user through the keyboard 5 and the camera controlling circuit 12 controls the opening and closing of the shutter 9 so as to automatically close the shutter 9 at the time when the exposure time has passed. Analog image data produced by the CCD 6 of the cooled CCD camera 1, which correspond to an amount of light received by the CCD 6, are then fed to the A/D converter 10 to be digitized and are temporarily stored in the image data buffer 11. Afterward, the image data are fed to the personal computer 3, subjected to image processing by the image processing means 34 and stored in the image data storing means 33. A visual image is displayed on the screen of the CRT display 4 by the image displaying means based on the image data stored in the image data storing means 33. However, since chemiluminescence emission or fluorescent light is very weak, the CCD 6 has to be exposed thereto for a long time. When exposing the CCD 6, if the exposure time is too long, an overexposed image is obtained and, on the other hand, if the exposure time is too short, an underexposed image is obtained. In either case, a desired image cannot be obtained and it is necessary to take anther picture with a different exposure time. However, it is inefficient to again take a picture. In Particular, the intensity of chemiluminescent emission generated by the contact of the chemiluminescent substance and the labeling substance falls with time elapse and chemiluminescent emission becomes insufficient. therefore, when it is necessary to take anther picture because of a improper exposure time, the process has to be restarted from the first step of selectively labeling the high molecular substance with the labeling substance. Such operation is extremely troublesome.

Therefore, the image producing apparatus according to this embodiment is constituted so as to monitor the state of exposure of the cooled CCD camera 1 and complete the exposure operation when the proper exposure time had passed to produce a desired image.

More specifically, in this embodiment, the personal computer 3 is provided with the timer means 31 and when the user inputs an exposure time during which an image is to be monitored, it stores the exposure time. When the exposure time for monitoring has passed after the exposure of the CCD 6 was started, an exposure stop signal is output from the timer means 31 to the camera controlling circuit 12 of the cooled CCD camera 1 via the CPU 30, thereby closing the shutter 9. At the same time, analog image data stored in the CCD 6 in the form of electron charges corresponding to an amount of light received by the CCD 6 as a result of the exposure are read out by the A/D converter 10 to be digitized and, after being temporarily stored in the image data buffer 11, the digitized image data are read out by the image data transferring means 32. The image data read out by the image data transferring means 32 are digitally added by the image processing means 34 to image data stored in the image data storing means 33 and stored in the image data storing means 33. Therefore, the image producing apparatus is constituted so that a visual image can be displayed on the screen of the CRT display 4 each elapse of the exposure time for monitoring and that the state of the exposure can be monitored.

The thus constituted image producing apparatus according to this embodiment detects fluorescent light from the image carrier carrying an image of a fluorescent substance and produces a visual image in the following manner. In this specification, an image carrier carrying an image of a fluorescent substance includes an image carrier carrying an image of a specimen labeled with a fluorescent substance and an image carrier carrying an image of a fluorescent substance obtained by combining enzyme with a labeled specimen, contacting the enzyme and a fluorescent substrate, thereby changing the fluorescent substrate to a fluorescent substance capable of emitting a fluorescent light.

An exposure time t of the CCD 6 during which the CCD 6 is to be exposed and after every elapse of which an image is monitored is first determined and when the user inputs the exposure time t through the keyboard 5, the exposure time t for monitoring is stored in the timer means 31. The exposure time t is determined to be, for example, one minute. An image carrier 18, which is a specimen, is then placed on the filter 24 and lens focus is adjusted by the user. After the dark box 2 has been closed, the user inputs an exposure start signal through the keyboard 5. The first blue light emitting diode stimulating ray source 21 alone or the second blue light emitting diode stimulating ray source 22 and the third blue light emitting diode stimulating ray source 23 are turned on by the light source control means 36, thereby emitting a stimulating ray toward the image carrier 18. At the same time, the exposure start signal is input through the CPU 30 to the camera controlling circuit 12 of the cooled CCD camera 1 and the shutter 9 is opened by the camera controlling circuit 12, thereby starting the exposure of the CCD 6.

Light components of wavelengths not in the vicinity of 450 nm are cut by the filters 24, 25, 26 from the stimulating rays emitted from the first blue light emitting diode stimulating ray source 21 alone or the second blue light emitting diode stimulating ray source 22 and the third blue light emitting diode stimulating ray source 23. As a result, the fluorescent substance contained in the image carrier 18 is stimulated by light having a wavelength in the vicinity of 450 nm, thereby emitting fluorescent light.

The fluorescent light emitted from the fluorescent substance contained in the image carrier 18 enters the photo-electrical surface of the image intensifier 15 via the filter 27 and the camera lens 16 and amplified so that an image is formed on the fluorescent surface of the image intensifier 15. The CCD 6 of the cooled CCD camera 1 receives light from the image formed on the fluorescent surface of the image intensifier 15 to convert the energy of the light to electric charges and accumulates them. Since light components having wavelengths in the vicinity of 450 nm are cut by the filter 27, only fluorescent light emitted from the fluorescent substance contained in the image carrier 18 is received by the CCD 6 of the cooled CCD camera 1.

When the exposure time t for monitoring has passed, the CPU 30 outputs an exposure stop signal to the camera controlling circuit 12 of the cooled CCD camera 1 and causes the CCD 6 to transfer electric charges accumulated therein to the A/D converter 10 and to produce digital image data. The thus digitized image data are temporarily stored in the image buffer 11. At the same time, the CPU 30 outputs a data transfer signal to the image data transferring means 32 and causes the image data transferring means 32 to read out the digital image data temporarily stored in the image data buffer 11 of the cooled CCD camera 1 and to output them to the image processing means 34. The image processing means 34 digitally adds the image data input from the image data transferring means 32 to image data stored in the image data storing means 33, if any, and stores them in the image data storing means 33. However, since no image data are stored in the image data storing means 33 at this time, the image processing means 34 stores image data input from the image data transferring means 32 in the image data storing means 33 without effecting any processing.

Afterward, when the user inputs an image reproduction signal through the keyboard 5, the image data stored in the image data storing means 33 are read out by the image displaying means 35 and a fluorescent image is displayed on the screen of the CRT display 4 based on the read out image data.

The user observes the fluorescent image displayed on the screen of the CRT display 4 and when it is judged that the exposure is insufficient, the user inputs an exposure restart signal through the keyboard 5.

As a result, the CPU 30 outputs a control signal to the light source controlling means 36 and the first blue light emitting diode stimulating ray source 21 alone or the second blue light emitting diode stimulating ray source 22 and the third blue light emitting diode stimulating ray source 23 are turned on by the light source control means 36, thereby emitting a stimulating ray toward the image carrier 18. At the same time, the exposure restart signal is input through the CPU 30 to the camera controlling circuit 12 of the cooled CCD camera 1 and the shutter 9 is opened by the camera controlling circuit 12, thereby restarting the exposure of the CCD 6.

When the exposure time t for monitoring has passed after the restart of the exposure, the CPU 30 outputs an exposure stop signal to the camera controlling circuit 12 of the cooled CCD camera 1 and causes the CCD 6 to transfer electric charges accumulated therein to the A/D converter 10 to produce digital image data. The thus digitized image data are temporarily stored in the image buffer 11. At the same time, the CPU 30 outputs a data transfer signal to the image data transferring means 32 and causes the image data transferring means 32 to read out the digital image data temporarily stored in the image data buffer 11 of the cooled CCD camera 1 and to output them to the image processing means 34. The image processing means 34 digitally adds the image data input from the image data transferring means 32 to the image data produced by the CCD 6 during the exposure time t for monitoring after the start of exposure and stored in the image data storing means 33 and stores them in the image data storing means 33.

Afterward, when the user inputs an image reproduction signal through the keyboard 5, the image data stored in the image data storing means 33 are read out by the image displaying means 35 and a fluorescent image is displayed on the screen of the CRT display 4 based on the read out image data.

A fluorescent image is displayed on the screen of the CRT display 4 and observed after each elapse of the exposure time t for monitoring in this manner and when it is judged that a desired fluorescent image has been produced, the user inputs an exposure completion signal through the keyboard 5. As a result, the CPU 30 outputs a control signal to the light source controlling means 36 and the first blue light emitting diode stimulating ray source 21 alone or the second blue light emitting diode stimulating ray source 22 and the third blue light emitting diode stimulating ray source 23 are turned off, thereby completing the production of the fluorescent image.

A chemiluminescent image is produced in the same manner as a fluorescent image except that the filter 27 is removed and the first blue light emitting diode stimulating ray source 21, the second blue light emitting diode stimulating ray source 22 and the third blue light emitting diode stimulating ray source 23 are kept off, a specimen 18 capable of emitting chemiluminescent emission is placed on the filter 24, and chemiluminescent emission emitted from the specimen 18 is photoelectrically detected. Namely, chemiluminescent emission emitted from the specimen 18 is photoelectrically detected by the CCD 6 via the camera lens 16 and the image intensifier 15 to produce image data and a chemiluminescent image is produced on the screen of the CRT display 4 after every elapse of the exposure time t for monitoring. As a result of displaying the chemiluminescent image on the screen of the CRT display 4 and observing it after every elapse of the exposure time t for monitoring, when it is judged that a desired chemiluminescent image has been produced, the user inputs an exposure completion signal through the keyboard 5, whereby the CPU 30 outputs the exposure completion signal to the camera controlling circuit 12 of the cooled CCD camera 1 and the production of a chemiluminescent image is completed.

According to this embodiment, since an image is displayed on the screen of the CRT display 4 and observed after each elapse of the exposure time t for monitoring, it is possible to monitor the state of exposure of the cooled CCD camera 1 during a take and produce a desired image by completing the exposure when the desired exposure time has passed. Further, according to this embodiment, the exposure of the cooled CCD camera 1 is interrupted after every elapse of the exposure time t for monitoring, digital image data transferred from the cooled CCD camera 1 are digitally added to digital image data stored in the image data storing means 33 and an image is displayed on the screen of the CRT display 4 based on the summed digital data. Therefore, it is possible to display an image corresponding to the total amount of light received by the cooled CCD camera 1 after the start of exposure on the screen of the CRT display 4. The displayed image can be monitored, observed and analyzed. Moreover, according to this embodiment, the image intensifier 15 is provided in front of the cooled CCD camera 1, thereby amplifying very weak chemiluminescence emission or fluorescent light and the cooled CCD camera 1 detects the thus amplified chemiluminescence emission or fluorescent light. Therefore, the exposure time can be reduced.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, an image is displayed on the screen of the CRT display 4 and observed after every elapse of the exposure time t for monitoring and when it is judged that a desired image is displayed on the screen of the CRT display 4, the exposure operation is completed. However, it is possible to determine in advance the exposure times for monitoring so as to be gradually shortened such as t1, t2, t3, t4 (t1>t2 >t3>t4), display an image on the screen of the CRT display 4 after the every elapse of each of the exposure times t1, t2, t3, t4 for monitoring and complete the exposure operation when a desired image has been produced. When the exposure times for monitoring are determined in this manner, the number of monitoring images can be reduced. Further, in the above described embodiment, although the exposure time for monitoring is determined and input to the timer means 31 prior to starting the exposure operation, instead only the exposure time for first monitoring the image may input and further exposure times for monitoring may be input by observing the image displayed on the screen of the CRT display 4 after the first monitoring.

Moreover, in the above described embodiment although the CCD 6 is used, instead of the CCD 6, another type of solid state image sensor such as a CID (Charge Injection Device), PDA (Photo-Diode Array) or MOS type imaging element may be used.

Furthermore, in the above described embodiment, although the exposure time t for monitoring is set and input by the user, an exposure time t for monitoring may be automatically determined by determining exposure times t for monitoring in accordance with the kinds of specimen in advance, storing them in the timer means 31 of the personal computer 3 and inputting the kind of specimen through the keyboard 5.

Further, in the above described embodiment, although the image intensifier 15 is provided in front of the cooled CCD camera 1, it is not absolutely necessary to provide the image intensifier 15.

Moreover, in the above described embodiment, although the cooled CCD camera 1 is used, it is possible to use a CCD camera provided with no cooling means depending on the intensity of fluorescent light emitted from a fluorescent substance.

Furthermore, in the above described embodiment, although the first blue light emitting diode stimulating ray source 21, the second blue light emitting diode stimulating ray source 22 and the third blue light emitting diode stimulating ray source 23 are provided in the dark box 2, only the first blue light emitting diode stimulating ray source 21, or only the second blue light emitting diode stimulating ray source 22 and the third blue light emitting diode stimulating ray source 23 may be provided.

Further, in the above described embodiment, blue light emitting diode stimulating ray sources 21, 22, 23 adapted to emit stimulating rays whose center wavelength is 450 nm are used, a light emitting diode stimulating ray source for emitting light whose center wavelength is in the range between 400 and 700 nm may be employed depending on the kind of fluorescent substance.

Furthermore, in the above described embodiment, when an exposure start signal is input through the keyboard 5, the first blue light emitting diode stimulating ray source 21 alone or the second blue light emitting diode stimulating ray source 22 and the third blue light emitting diode stimulating ray source 23 are turned on by the light source control means 36. However, it is not absolutely necessary to constitute the light source control means 36 so as to be controlled by the personal computer 3 and the light source control means 36 may be manually operated.

Moreover, in the above described embodiment, the filter 27 for cutting light having a wavelength in the vicinity of 450 nm is detachably mounted on the front surface of the camera lens 16 and the image producing apparatus is constituted so as to be able to detect extremely weak chemiluminescent emission and produce a chemiluminescent image when the filter 27 is removed. However, the image producing apparatus may be constituted so as to produce only a fluorescent image by the fluorescent detection system, in which case the filter 27 can be fixed to the front surface of the camera lens 16.

Further, in the above described embodiment, although the first blue light emitting diode stimulating ray source 21, the second blue light emitting diode stimulating ray source 22 and the third blue light emitting diode stimulating ray source 23 are provided, it is unnecessary to provide the first blue light emitting diode stimulating ray source 21, the second blue light emitting diode stimulating ray source 22 and the third blue light emitting diode stimulating ray source 23 and also filters 24, 25, 26, 27 in the case where the image producing apparatus is used only for detecting chemiluminescence emission and producing a chemiluminescent image.

Moreover, in the above described embodiment, although the CCD camera 1 is formed with heat dispersion fins 14 over substantially half its length for dispersing heat released from the Peltier element 8, it is possible to form the heat dispersion fins 14 on the periphery of the CCD camera 1 over its entire length and the arrangement of the heat dispersion fin 14 on the periphery of the CCD camera 1 may be arbitrarily determined.

Furthermore, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image producing apparatus which uses a solid state image sensor and can always take a picture of an object with a proper exposure time to produce an image.

What is claimed is:

1. An image producing apparatus, comprising:
   imaging means having a solid state image sensor for producing image data,
   exposure control means for starting and stopping exposure of the solid state image sensor at predetermined times,
   image data storing means for storing image data produced by the imaging means,
   image processing means for producing final image data by adding at least the image data produced by the imaging means to intermediate image data previously stored in the image data storing means, wherein the intermediate image data is stored in the image data storing means after the exposure of the solid state image sensor is stopped by the exposure control means at a first predetermined time, and wherein the final image data is stored in the image data storing means, and
   image displaying means for displaying an intermediate image on display means based on the intermediate image data stored in the image data storing means and for subsequently displaying a final image based on said final image data stored in the image data storing means.

2. An image producing apparatus in accordance with claim 1 wherein the imaging means is constituted as a cooled CCD (charge coupled device).

3. An image producing apparatus in accordance with claim 1 which further comprises input means through which the predetermined times can be determined.

4. An image producing apparatus in accordance with claim 2 which further comprises input means through which the predetermined times can be determined.

5. An image producing apparatus in accordance with claim 1 which further comprises an image intensifier in front of the solid state image sensor.

6. An image producing apparatus in accordance with claim 2 which further comprises an image intensifier in front of the solid state image sensor.

7. An image producing apparatus in accordance with claim 3 which further comprises an image intensifier in front of the solid state image sensor.

8. An image producing apparatus in accordance with claim 1 which further comprises at least one light emitting diode stimulating ray source constituted so as to emit a stimulating ray whose center wavelength is between 400 nm and 700 nm.

9. An image producing apparatus in accordance with claim 2 which further comprises at least one light emitting diode stimulating ray source constituted so as to emit a stimulating ray whose center wavelength is between 400 nm and 700 nm.

10. An image producing apparatus in accordance with claim 3 which further comprises at least one light emitting diode stimulating ray source constituted so as to emit a stimulating ray whose center wavelength is between 400 nm and 700 nm.

11. An image producing apparatus in accordance with claim 4 which further comprises at least one light emitting diode stimulating ray source constituted so as to emit a stimulating ray whose center wavelength is between 400 nm and 700 nm.

12. An image producing apparatus in accordance with claim 5 which further comprises at least one light emitting diode stimulating ray source constituted so as to emit a stimulating ray whose center wavelength is between 400 nm and 700 nm.

13. An image producing apparatus in accordance with claim 6 which further comprises at least one light emitting diode stimulating ray source constituted so as to emit a stimulating ray whose center wavelength is between 400 nm and 700 nm.

14. An image producing apparatus in accordance with claim 1 which further comprises at least one light emitting diode stimulating ray source constituted so as to emit a stimulating ray whose center wavelength is between 400 nm and 550 nm.

15. An image producing apparatus in accordance with claim 2 which further comprises at least one light emitting diode stimulating ray source constituted so as to emit a stimulating ray whose center wavelength is between 400 nm and 550 nm.

16. An image producing apparatus in accordance with claim 3 which further comprises at least one light emitting diode stimulating ray source constituted so as to emit a stimulating ray whose center wavelength is between 400 nm and 550 nm.

17. An image producing apparatus in accordance with claim 4 which further comprises at least one light emitting diode stimulating ray source constituted so as to emit a stimulating ray whose center wavelength is between 400 nm and 550 nm.

18. An image producing apparatus in accordance with claim 5 which further comprises at least one light emitting diode stimulating ray source constituted so as to emit a stimulating ray whose center wavelength is between 400 nm and 550 nm.

19. An image producing apparatus in accordance with claim 6 which further comprises at least one light emitting diode stimulating ray source constituted so as to emit a stimulating ray whose center wavelength is between 400 nm and 550 nm.

20. An image producing apparatus, comprising:
   an image sensing device that produces first image data at a first time and produces second image data at a second time, wherein said second time is after said first time;
   a controller that instructs said image sensing device to be exposed for a first exposure time to produce said first image and that instructs said image sensing device to be exposed for a second exposure time to produce said second image;
   a memory device, wherein said controller stores intermediate image data in said memory device, wherein said intermediate image data is at least indirectly based on said first image data, wherein, after said intermediate image data is stored, said controller produces third image data by adding at least the second image data and said intermediate image data, and wherein said controller stores said third image data in said memory device; and
   a display that displays said intermediate image data and subsequently displays said third image data.

21. The apparatus as claimed in claim 20, wherein said first exposure time equals said second exposure time.

22. The apparatus as claimed in claim 20, wherein said first exposure time is greater than said second exposure time.

23. The apparatus as claimed in claim 20, further comprising:
   an input device, wherein a user can input at least one of said first exposure time and said second exposure time by inputting an appropriate command via said input device.

24. The apparatus as claimed in claim 20, further comprising an input device, wherein a user can input said first exposure time and said second exposure time by inputting appropriate commands via said input device.

25. The apparatus as claimed in claim 20, further comprising an input device,
   wherein a user inputs a final reproduction command via said input device, and
   wherein said display displays said third image data in response to said final reproduction command.

26. The apparatus as claimed in claim 25, wherein said user inputs a final reproduction command via said input device, and
   wherein said display displays said third image data in response to said final reproduction command.

27. A method for displaying an image, comprising:
   (a) producing first image data via an image sensing device at a first time by exposing said image sensing device for a first exposure time;
   (b) producing second image data via said image sensing device at a second time by exposing said image sensing device for a second exposure time to produce said second image, wherein said second time is after said first time;
   (c) storing intermediate image data, wherein said intermediate image data is at least indirectly based on said first image data;
   (d) after said intermediate image data is stored, producing third image data by adding at least the second image data and said intermediate image data;
   (e) storing said third image data;
   (f) displaying said intermediate image data after said intermediate image is stored;
   (g) displaying said third image data after said intermediate image data is displayed.

28. The apparatus as claimed in claim 27, wherein said first exposure time equals said second exposure time.

29. The apparatus as claimed in claim 27, wherein said first exposure time is greater than said second exposure time.

30. The apparatus as claimed in claim 27, further comprising:
   (h) inputting a command from a user via an input device to set at least one of said first exposure time and said second exposure time.

31. The apparatus as claimed in claim 27, further comprising:
   (h) inputting commands from a user via an input device to set said first exposure time and said second exposure time.

32. The apparatus as claimed in claim 27, further comprising:
   (h) inputting a final reproduction command from a user via an input device; and
   (i) displaying said third image data in response to said final reproduction command.

33. The apparatus as claimed in claim 32, further comprising
   (h) inputting a final reproduction command from said user via said input device; and
   (i) displaying said their image data in response to said final reproduction command.

* * * * *